Oct. 1, 1935.  J. DOWNING  2,016,230

LAWN MOWER CONSTRUCTION

Filed Aug. 1, 1934

INVENTOR,
John Downing
BY Lancaster, Allwine and Rommel
ATTORNEYS

Patented Oct. 1, 1935

2,016,230

UNITED STATES PATENT OFFICE 2,016,230

LAWN MOWER CONSTRUCTION

John Downing, Reading, Pa., assignor to Reading Hardware Corporation, Reading, Pa., a corporation Application August 1, 1934, Serial No. 737,991

3 Claims. (Cl. 56—294)

This invention relates to improvements in lawn mowers.

The primary object of this invention is the provision of improved cutting means for lawn mowers, and has particular reference to a flexible spring steel cutter blade which may be so associated with the rotary cutter blades of the lawn mower that when objects such as twigs, stones, etc. lodge between the revolving cutter blades and the bed knife blade, the latter will flex without injury thereto to permit a continued operation of the lawn mower, and will spring back into position to shear with the revolving cutter blade or blades.

A further object of this invention is the provision of an improved bed knife blade cutter arrangement for lawn mowers and the like which is so associated therewith that it is removably and rigidly held in position, and reversible into four different positions.

Other objects and advantages of this invention will be apparent during the course of the following detailed description.

In the accompanying drawing, forming a part of this specification, and wherein similar reference characters designate corresponding parts throughout the several views, Figure 1 is an end elevation of the blade and its holding means, with a portion of the blade in section to designate the manner in which the same is clamped.

Figure 1:
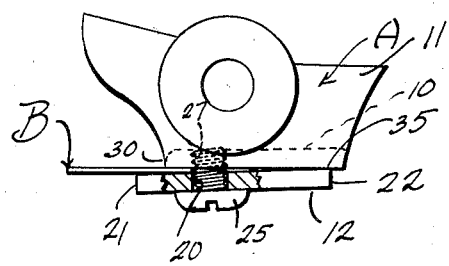
Figure 2:
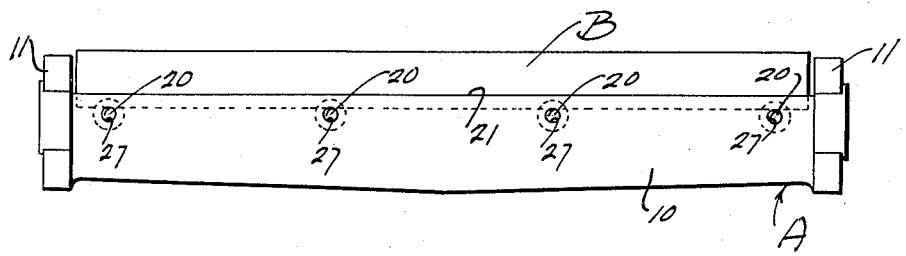
Figure 2 is a top plan view of the cutter blade and its holding means.
Figure 3:
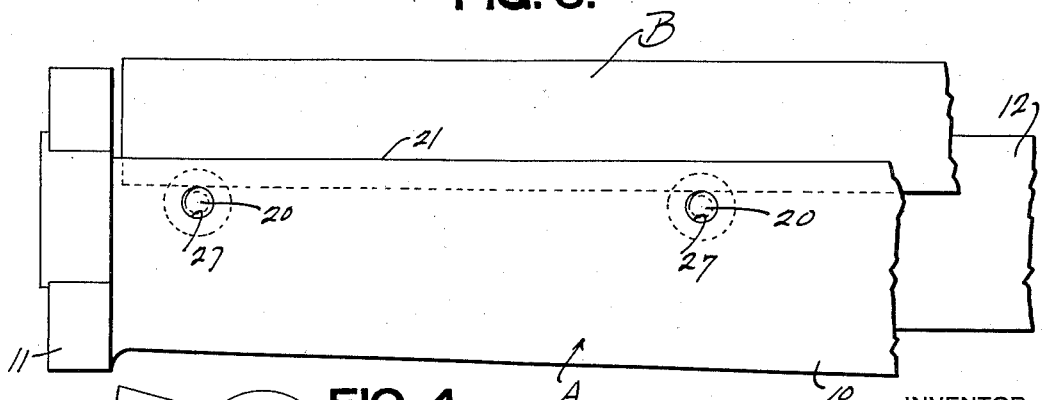
Figure 3 is a fragmentary view of the blade and its holding means showing the relation of the bed and supporting bars with respect to the flexible cutter blade.

In the drawing, wherein for the purpose of illustration are shown preferred and modified forms of the invention, the letter A may generally designate the holder frame which is fitted into the lawn mower in conventional manner, including a bed bar 10 and upstanding side connecting flange or bracket portions 11. In association therewith there is provided a rigid supporting bar 12 which is associated with the bed bar in such manner as to most efficiently carry the stationary flexible cutter blade B.

The blade B is preferably made of a special alloy steel. It is thin, flexible and springy, and is so set with respect to the revolving cutter blades that it will flex incident to the cutting operation so that any bulky objects, such as twigs or stones will readily pass between the revolving cutter blade and the same without injury to any of the blades and insuring a correct shearing action immediately thereafter. It is of uniform thickness and rectangular in plan. Its longitudinal edges are at right angles to the parallel upper and lower surfaces thereof and these longitudinal edges are of a width the same as the thickness of the blade, so that the blade is reversible into four different positions.

The blade B is adapted to be merely clamped between the bed bar 10 and the supporting bar 12 in such manner that it may be removed with facility either for readjustment or reversing, and held properly against liability of loosening so that it will flex in proper shearing relation with the revolving cutter blades.

The supporting bar 12 is preferably of uniform thickness and of considerably greater thickness than the blade B. It is rigid throughout its length and is provided with a series of transverse openings 26 therethrough closer to the front edge 21 than the rear edge 22. Clamping screws 25 having large heads which engage a considerable area of the undersurface of the supporting bar 12 are provided for clamping the bar 12 to the bed bar 10. The screw threaded shanks of these clamping screws 25 slip freely through the openings 20 and detachably engage in the respective tapped openings 27 provided therefor in the bed bar 10, closer to the front edge 30 thereof than the rear edge. There is a slight forward overhang of the bottom supporting or clamping bar 12 at its front edge with respect to the front edge 30 of the bed bar 10. The flexible blade B is clamped between the clamping or supporting bar 12 and the bed bar 10 forwardly of the clamping screws 25, preferably with an edge thereof against the screw threaded shanks of the clamping screws 25, as shown in Figures 1 and 4 of the drawing, in order to insure the correct alignment of the stationary blade B with respect to the rotary cutter blades.

In order to insure a correct clamping action of the cutter blade B between the bed and supporting bars 10 and 12 the tapped openings 27 in the bed plate 10 may be disposed at an angle of less than 90° with respect to the plane of the bottom surface of the bar 10, so that the rear edge 35 of the supporting bar 12 will contact the undersurface of the bed bar 10. This insures that there will be no space at the edge 35 as would likely be the case if the openings 27 were on axes at right angles to the plane of the bottom surface of the bed plate 10. In the latter event the space between the bed plate 10 and the supporting bar 12 rearwardly of the screws 25 would occasionally permit the supporting bar 12 to move towards the bed bar or plate incident to hitting some solid object. This might result in bending the shanks of the screws 25 and the loosening of the flexible cutter blade B.

Figure 4:
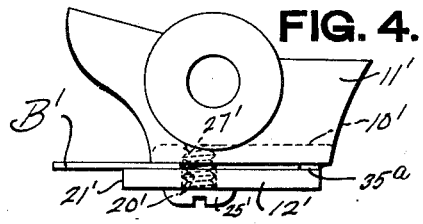
Figure 4 is a modified construction of supporting bar to effect a more efficient clamping action of the flexible cutter blade between the bed bar and the supporting bar.

In a modification, shown in Figure 4, the upper surface of the supporting bar 12' close to the rear edge 22' thereof, may be provided with bosses or projections 35a at intervals, which engage the undersurface of the bed bar 10' in order to position the upper surface of the supporting bar 12' and the undersurface of the bed bar 10' parallel. This insures that the blade B' will be clamped between the two bars 10' and 12' over a considerable area with an effective clamping action. In this case, of course, the axes of the tapped openings 27' will be at right angles to the undersurface of the bed plate 10'.

Various changes in the shape, size, and arrangement of parts may be made to the forms of invention herein shown and described, without departing from the spirit of the invention or the scope of the claims.

I claim:

1. In a blade clamping construction for the stationary blades of a mowing machine the combination of a fixed bed plate, a clamping supporting plate, screws clamping the supporting plate to the bed plate along adjacent longitudinal edges of the said plates closer to said edges than the opposite edges of said plates, the said bed plate having tapped openings therein disposed at an angle of slightly less than 90° with respect to the plane of the bed plate, and the clamping plate having openings therein for receiving said screws whereby when the screws clamp the clamping plate upon the bed plate the longitudinal edge of the bed plate most remote from said screws will clamp against the undersurface of the bed plate, and a flexible cutter blade clamped between the bed plate and supporting plate at the longitudinal margins thereof closest to the clamping screws.

2. In a frame construction for the stationary blades of lawn mowers and the like the combination of a flat elongated bed plate, a flat elongated clamping plate of inherently rigid construction, a series of clamping screws along longitudinal cooperating marginal portions of the bed plate and supporting plate holding said plates together, a flexible cutter blade clamped between the bed plate and supporting plate at said longitudinal margins of the said plates, and bosses at opposite longitudinal margins of the said bed and supporting plate and between the facing surfaces thereof for holding the facing surfaces of said bed plate and supporting plate in substantial parallelism when the screws are in position for flat surface clamping of the cutter blade between said bed plate and supporting plate.

3. In a blade clamping construction for the stationary blades of a mowing machine or the like, the combination of a fixed rigid flat bed plate, a rigid and inflexible supporting plate of substantially the same thickness as the bed plate, a series of clamping screws releasably connected with the forward portions of said plates, connecting them together so that the fore marginal portion of the supporting plate projects beyond the forward edge of the bed plate and with the rear edge of the supporting plate located forwardly of the rear edge of the said bed plate, and a flat flexible cutter blade having a portion thereof of minor width clamped longitudinally between the rigid bed and supporting plates forwardly of said screws, with its rear edge resting against said screws and with the forward marginal portion of said cutter blade projecting appreciably beyond the forward edge of the supporting plate.

JOHN DOWNING.